Aug. 19, 1958 L. E. MULLER 2,847,819
REVERSIBLE EXHAUST MANIFOLD SYSTEM
Filed Nov. 7, 1952 2 Sheets-Sheet 1

INVENTOR
*Lloyd E. Muller*
BY
*Willits, Helwig & Baillio*
ATTORNEYS

Aug. 19, 1958 L. E. MULLER 2,847,819
REVERSIBLE EXHAUST MANIFOLD SYSTEM
Filed Nov. 7, 1952 2 Sheets-Sheet 2

INVENTOR
Lloyd E. Muller
BY
Willits, Helmig & Baillio
ATTORNEYS

United States Patent Office 2,847,819
Patented Aug. 19, 1958

2,847,819

REVERSIBLE EXHAUST MANIFOLD SYSTEM

Lloyd E. Muller, Flint, Mich., assignor to General Motors Corporation, Detroit, Mich., a corporation of Delaware Application November 7, 1952, Serial No. 319,311

1 Claim. (Cl. 60—29)

This invention relates to exhaust systems for engines and has particular relation to exhaust systems especially applicable for employment with V-type internal combustion engines for automotive and other uses.

It has been the practice heretofore in the construction of V-type engines for automotive and other uses to employ exhaust manifolds on the opposite sides of the engine that are considerably different. On one side of the engine the exhaust outlet from the manifold may open from the middle of the manifold, whereas on the other side of the engine the exhaust outlet may open from one end of the manifold. It is then customary to employ coupling conduits of various kinds which connect with these manifold outlets and which are in turn connected to exhaust conduits leading to the rear of the vehicle and from one or both sides of the engine. If one exhaust conduit is used, it has been customary to form a divided coupling by obliquely severing the adjacent ends of the coupling conduits and welding the obliquely formed edges thereof together to provide a common outlet which may be connected to the single exhaust conduit employed. It is also customary to make divided coupling conduits of this kind by casting the entire coupling and by casting the ends thereof together obliquely with respect to the axes of the conduits.

Exhaust systems constructed in this manner are considered objectionable because differences in the exhaust manifolds that are required and because of the manufacturing cost and other difficulties involved in constructing the divided manifold couplings employed when one exhaust conduit is used. Also, if the conduits are either welded or cast in the manner described, the coupling tends to become overheated in the region where the two conduits are welded or otherwise secured together.

It is proposed to provide an exhaust system for V-type and other engines for automotive and other uses, in which, when two exhaust manifolds are employed, the exhaust manifolds are of generally similar construction. It is proposed to make the opposite ends of these manifolds similar and in such a way as to have branch passages at the ends and leading to the exhaust passages of two cylinders. The middle parts of the manifolds are preferably formed as arcuate connecting passages between the ends in which the branch passages are formed. The middle parts of the manifolds are formed to provide outlets leading downwardly and toward the opposite end of each manifold when two manifolds are reversed and installed on opposite sides of an engine. The manifold outlets also may be formed at one end of the middle part or main collecting passage and adjacent the region where the collecting passage is connected to the branch passages. When the manifolds are so constructed and placed in a reverse position on opposite sides of the V-type or other engine, then the manifold outlets will open downwardly on both sides of the engine and forwardly on one side and rearwardly on the other. It is proposed to employ a divided manifold coupling which may be connected to each of these manifold outlets. If the manifold coupling is disposed on one side of the engine, then one of the branches of the coupling will be formed in such a way as to extend forwardly and across beneath the engine and rearwardly where it will terminate adjacent the rear end of the other branch. The other branch is formed to extend downwardly and rearwardly from the manifold outlet on the same side of the engine. It is proposed to have the joint between the two branches of the manifold coupling formed by obliquely and planularly forming the ends of the conduits and in such manner that the peripheral dimensions of the conduits will remain constant. The two planular ends are then joined within and secured to a flanged coupling ring or member which is adapted to be connected to the flanged end of an exhaust conduit for delivering the exhaust gas away from the engine.

In the drawings:

Figure 3 is taken substantially in the plane of line 3—3 of Figure 1.

Figure 1:
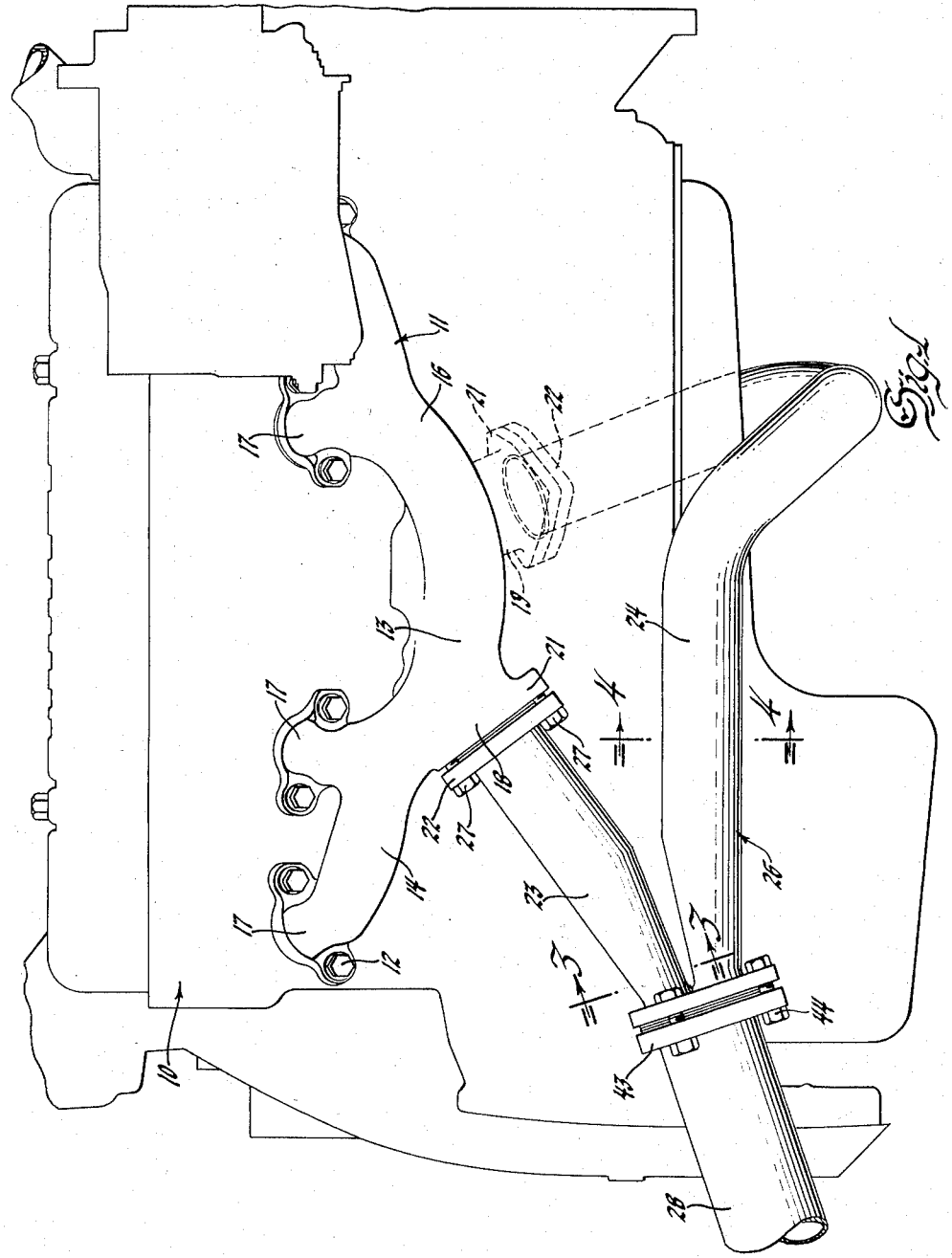
Figure 1 is a side elevational view of an engine employing exhaust manifolds and a divided manifold coupling embracing the principles of the invention.
Figure 2:
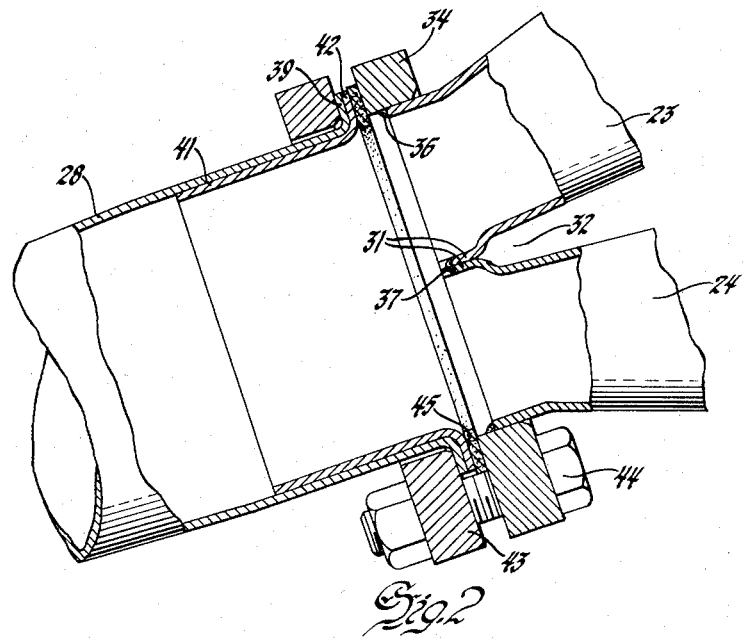
Figure 2 is a fragmentary vertical sectional view taken through the bifurcated end of the divided manifold coupling and the exhaust conduit leading therefrom.

The V-type engine indicated at 10 comprises similar exhaust manifolds 11 secured by bolts 12 to the opposite sides of each block thereof. The exhaust manifolds 11 may comprise a central arcuate middle or collecting section indicated at 13 and which receives exhaust gases from end branches indicated at 14 and 16. End branches 14 and 16 are divided in such a way as to provide individual inlet passages indicated at 17 and one of which may receive exhaust gas from each of the four cylinders in the bank of cylinders to which the manifold is secured. The central arcuate exhaust gas collecting section 13 in each manifold may be formed in such manner as to provide manifold outlets indicated at 18 and 19. The manifold outlets 18 and 19 are each formed adjacent one end of the middle or exhaust gas collecting section 13 and each opens downwardly and rearwardly or forwardly, depending on the side of the engine to which the manifold is attached. The manifold outlets 18 and 19 are flanged at 21 to engage the flanges 22 at the ends of branch conduits 23 and 24 of a divided manifold coupling 26. The flanges 21 and 22 may be secured thereto by screws or bolts indicated at 27.

Figure 3:
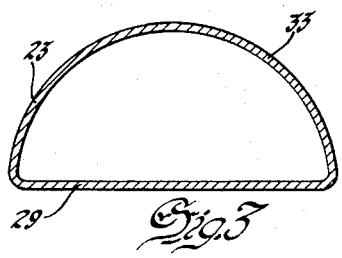
Figure 3 is a cross-sectional view through one of the branch conduits of the divided manifold coupling illustrated by the preceding figures.
Figure 4:
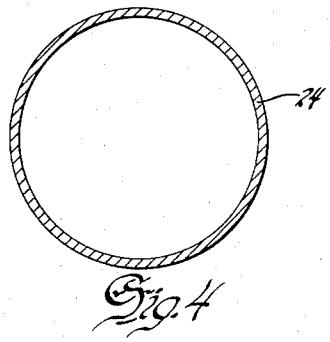
Figure 4 is a cross-sectional view through one of the branch conduits of the divided manifold coupling and is taken substantially in the plane of line 4—4 on Figure 1.

The divided manifold coupling 26 may be formed in any suitable manner to collect exhaust gas from a plurality of manifolds, although in the present instance the manifold coupling 26 is formed in such a way that the branch conduits 23 and 24 may have the ends thereof brought together on one side of the engine 10 so as to communicate with a single exhaust conduit 28 extending away from the engine at one side of the engine. The manifold coupling 26 may be formed by employing two tubes or conduits of circular cross section such as is indicated by Figure 4. The adjacent ends of the conduits 23 and 24 may be obliquely formed towards the ends thereof to provide adjacent planular walls indicated at 29 in Figure 3. It is preferred to form the obliquely disposed planular walls indicated at 29 in such manner that the peripheral dimensions of each conduit will remain the same from the part of the conduit of circular cross section to the end of the conduit where the width of the planular part 29 is greatest. It is also preferred to form the ends of the conduits in such manner as to provide outwardly disposed and parallel wall end portions 31 at the ends of the planular parts 29 of each of the conduits 23 and 24. When these outwardly projecting wall end parts are brought together, it will be apparent that an air space 32 will be provided between each of the conduits 23 and 24 to within a very short distance of the ends of the conduits 23 and 24. The remaining walls of the conduits 23 and 24 opposite the planular walls 29 may be formed in any suitable manner, although it is preferred to form these walls in such manner that they will be of semi-circular cross section such as is indicated at 33. When the walls 33 are so formed it is possible to bring the two ends of the conduits 23 and 24 together with the wall ends 31 in engagement and within a flange coupling member of circular cross section indicated at 34. The ends of the conduits 23 and 24 then may be welded as is indicated at 36 or otherwise secured to inner surface of the flange coupling 34 and the two wall ends indicated at 31 may be welded together within the coupling as is indicated at 37.

The exhaust conduit 28 may be formed in any suitable manner although, in the present instance, the conduit 28 is formed by forming an outwardly disposed flange 39 at the end of the conduit and securing within the flanged end a short section of a slightly smaller tube indicated at 41. The smaller tube 41 also may be flanged outwardly as is indicated at 42. A collar 43 may be disposed on the conduit 28 outside of the flanges 39 and 42 and may be secured by bolts indicated at 44 to the flange coupling 34 upon a gasket 45.

It will be apparent that the similarity of the manifolds 11 will result in a substantially constant back pressure in each of the manifolds 11 and that the construction of the manifold coupling 26 is not only relatively inexpensive to manufacture but that it will discharge into the conduit 28 the exhaust gas from the branch conduits 23 and 24 in a manner to provide the least possible turbulence resulting from bringing together in one conduit the exhaust gas from two opposed manifolds of an engine. It will also be apparent that the space 32 between the branch conduits 23 and 24 will tend to prevent overheating of the conduits in the region where the two conduits are brought together within the flanged coupling 34.

The claim:

An exhaust system for engines comprising a pair of similar exhaust manifolds adapted to be secured to the opposite sides of a V-type engine, said exhaust manifolds having outlets disposed obliquely with respect to the longitudinal axis of said engine with one of said outlets being disposed to open downwardly and rearwardly and the other downwardly and forwardly with respect to said engine, a divided manifold coupling having branch conduits secured to each of said manifold outlets, one of said branch conduits being secured to the one of said manifold outlets facing downwardly and forwardly with respect to said engine and being formed to cross over beneath said engine to the opposite side of said engine and to extend rearwardly and to terminate adjacent the rear end of the other of said conduits, said other of said conduits being formed to project downwardly and rearwardly from the downwardly and rearwardly opening manifold outlet on said opposite side of said engine, and a rearwardly extending exhaust conduit at which the adjacent ends of said branch conduits terminate and to which said conduits are secured in parallel relation, said branch conduits being spaced except at said ends where said branch conduits are so secured and where said branch conduits are secured to one another.

References Cited in the file of this patent

UNITED STATES PATENTS

| | | |
|---|---|---|
| 1,101,699 | Klein | June 30, 1914 |
| 1,250,950 | Bolton | Dec. 25, 1917 |
| 1,761,960 | Armitage | June 3, 1930 |
| 1,868,355 | Goldberg | July 19, 1932 |
| 1,984,242 | Trainer et al. | Dec. 11, 1934 |
| 2,446,631 | Burks | Aug. 10, 1948 |
| 2,455,493 | Jacobs | Dec. 7, 1948 |
| 2,533,720 | Danel | Dec. 12, 1950 |
| 2,541,973 | Wiegman | Feb. 13, 1951 |
| 2,603,199 | Moseley | July 15, 1952 |
| 2,757,652 | Rothwell | Aug. 7, 1956 |

FOREIGN PATENTS

| | | |
|---|---|---|
| 501,423 | Great Britain | Feb. 23, 1939 |
| 707,344 | France | Apr. 13, 1931 |
| 869,688 | France | Nov. 17, 1941 |
| 301,574 | Germany | Nov. 3, 1917 |